US009863570B2

(12) United States Patent
Robinson

(10) Patent No.: US 9,863,570 B2
(45) Date of Patent: Jan. 9, 2018

(54) HOPPER TEE WITH WEAR PORT

(75) Inventor: Randy Donald Robinson, Kingsville, MO (US)

(73) Assignee: Knappco Corporation, Riverside, MO (US)

(*) Notice: Subject to any disclaimer, the term of this patent is extended or adjusted under 35 U.S.C. 154(b) by 298 days.

(21) Appl. No.: 13/523,740

(22) Filed: Jun. 14, 2012

(65) Prior Publication Data
US 2013/0333779 A1 Dec. 19, 2013

(51) Int. Cl.
F16L 41/02 (2006.01)
F16L 57/06 (2006.01)
B65G 53/10 (2006.01)

(52) U.S. Cl.
CPC ............. F16L 57/06 (2013.01); F16L 41/021 (2013.01); B65G 53/10 (2013.01); F16L 41/02 (2013.01); F16L 41/026 (2013.01); Y10T 137/8225 (2015.04); Y10T 137/8242 (2015.04); Y10T 137/8259 (2015.04); Y10T 137/8275 (2015.04); Y10T 137/8292 (2015.04); Y10T 137/8309 (2015.04); Y10T 137/8326 (2015.04); Y10T 137/8342 (2015.04); Y10T 137/8359 (2015.04); Y10T 137/85938 (2015.04)

(58) Field of Classification Search
CPC ....... F16L 41/021; F16L 41/026; F16L 41/02; Y10T 137/85938; Y10T 137/8225; Y10T 137/8242; Y10T 137/8259; Y10T 137/8275; Y10T 137/8292; Y10T 137/8309; Y10T 137/8326; Y10T 137/8342; Y10T 137/8359

USPC .......................................... 137/561 A, 68.18
See application file for complete search history.

(56) References Cited

U.S. PATENT DOCUMENTS

| | | | |
|---|---|---|---|
| 1,153,684 A | 9/1915 | Griffin | |
| 1,305,491 A | 6/1919 | Poppenhusen | |
| 1,351,573 A | 8/1920 | Hopwood | |
| 1,755,899 A * | 4/1930 | Root | 285/189 |
| 1,962,168 A * | 6/1934 | Andrus | 340/605 |
| 1,977,177 A | 10/1934 | Florez | |
| 2,243,687 A * | 5/1941 | Sutherland | 403/173 |
| 4,233,926 A | 11/1980 | Rogers | |
| 4,652,020 A * | 3/1987 | Gilroy | 285/47 |
| 4,735,229 A * | 4/1988 | Lancaster | 137/375 |
| 4,848,396 A * | 7/1989 | Sisk | 137/375 |
| 4,874,007 A | 10/1989 | Taylor | |
| 4,922,748 A | 5/1990 | Hopenfeld | |

(Continued)

Primary Examiner — Michael R Reid
Assistant Examiner — Christopher Ballman
(74) Attorney, Agent, or Firm — Spencer Fane LLP

(57) ABSTRACT

A hopper tee for redirecting the flow of material from one passage to another passage includes a radius providing a transition between the passages. A port at the exterior of the radius includes an upwardly-open cavity having a bottom wall disposed within the radius and forming a sacrificial wall extending between the bottom wall and the inner surface of the radius. The cavity provides an indication that material moving through the tee has worn the wall of the radius by the creation of a passage between the interior of the tee and the cavity and expelling material through the passage to the exterior of the tee. A plug may be secured within the cavity allowing a user to continue to use the tee until the tee is rotated or replaced. The radius may include a thickened wall for providing added structural support and sacrificial material.

22 Claims, 9 Drawing Sheets

(56) References Cited

U.S. PATENT DOCUMENTS

| | | | |
|---|---|---|---|
| 5,177,468 A * | 1/1993 | Baldwin et al. | 340/652 |
| 5,188,396 A | 2/1993 | Calvin | |
| 5,228,478 A | 7/1993 | Kleisle | |
| 5,387,015 A * | 2/1995 | Sisk | 285/55 |
| 2002/0187013 A1* | 12/2002 | Campbell | 406/127 |

* cited by examiner

HOPPER TEE WITH WEAR PORT

BACKGROUND

The present disclosed subject matter relates generally to a conduit, and in particular a hopper tee assembly including a body wall wear indicator.

Conduits, including hopper tees, are used to transfer material from containers. A hopper tee includes a vertical portion that intersects a horizontal portion, generally forming an inverted T-shape. The vertical portion connects to the bottom of a container, such as a bulk material tank trailer, for transferring the material from the container to the horizontal portion. The horizontal portion has an opening at each end for moving the material in an output direction.

Material moving from the container into the hopper tee, and material moving through the vertical portion and horizontal portion, can abrade the walls of the hopper tee. In particular, heavy abrasion often occurs along the body wall of the hopper tee where the vertical portion intersects the horizontal portion, and can cause failure of the hopper tee.

Heretofore there has not been available a hopper tee assembly with the advantages and features of the disclosed subject matter.

SUMMARY

A conduit including a body wall wear indicator includes a tubular vertical portion that communicates with an elongated tubular horizontal portion forming generally and inverted T-shaped hopper tee. The horizontal portion extends between first and second ends. The transition between the vertical portion and the horizontal portion towards each of the first and second ends is by a radius. Each radius includes a portion having a body wall that has a greater thickness than portions of the body wall of the vertical portion and horizontal portion.

A port, in the form of an upwardly-open cavity is located on or adjacent each radius and is open to the exterior of the hopper tee. The port includes a bottom wall located at a depth between the outside of the hopper tee and the inside of the tee.

During use, material moving through the hopper tee erodes the interior wall of the radius. When the wall is worn through to the point where a passage is formed between a wear port and the interior of the tee, material escapes through the passage providing a visual indication that the tee needs to be rotated or replaced. A plug inserted into the worn wear port allows the user to seal the passage until the tee is rotated or discarded.

BRIEF DESCRIPTION OF THE DRAWINGS

The drawings constitute a part of this specification and include exemplary embodiments of the disclosed subject matter, and illustrate various objects and features thereof.

DETAILED DESCRIPTION

Figure 1:
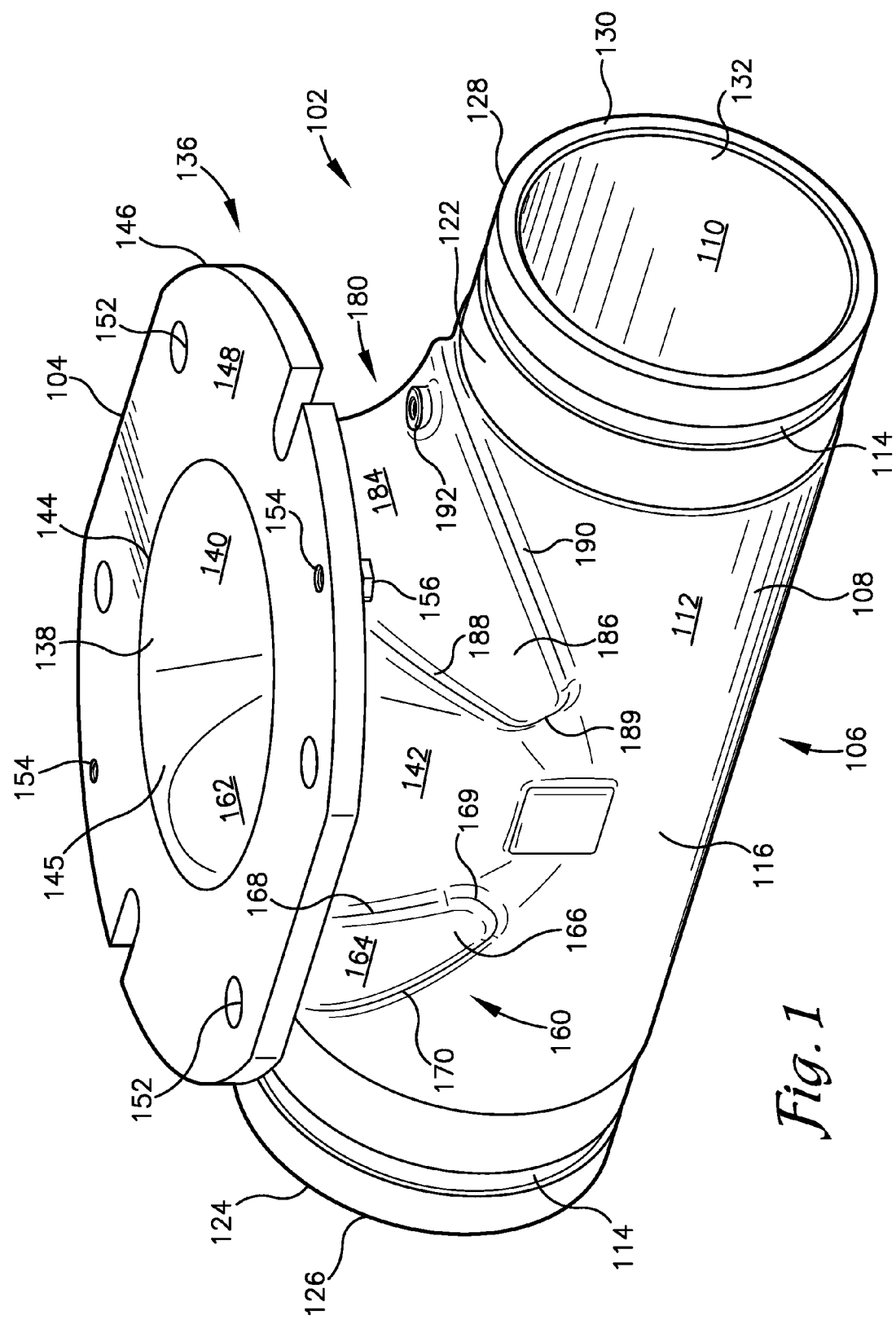
FIG. 1 is a perspective view of a conduit with a body wall wear indicator embodying principles of the disclosed subject matter.
Figure 2:
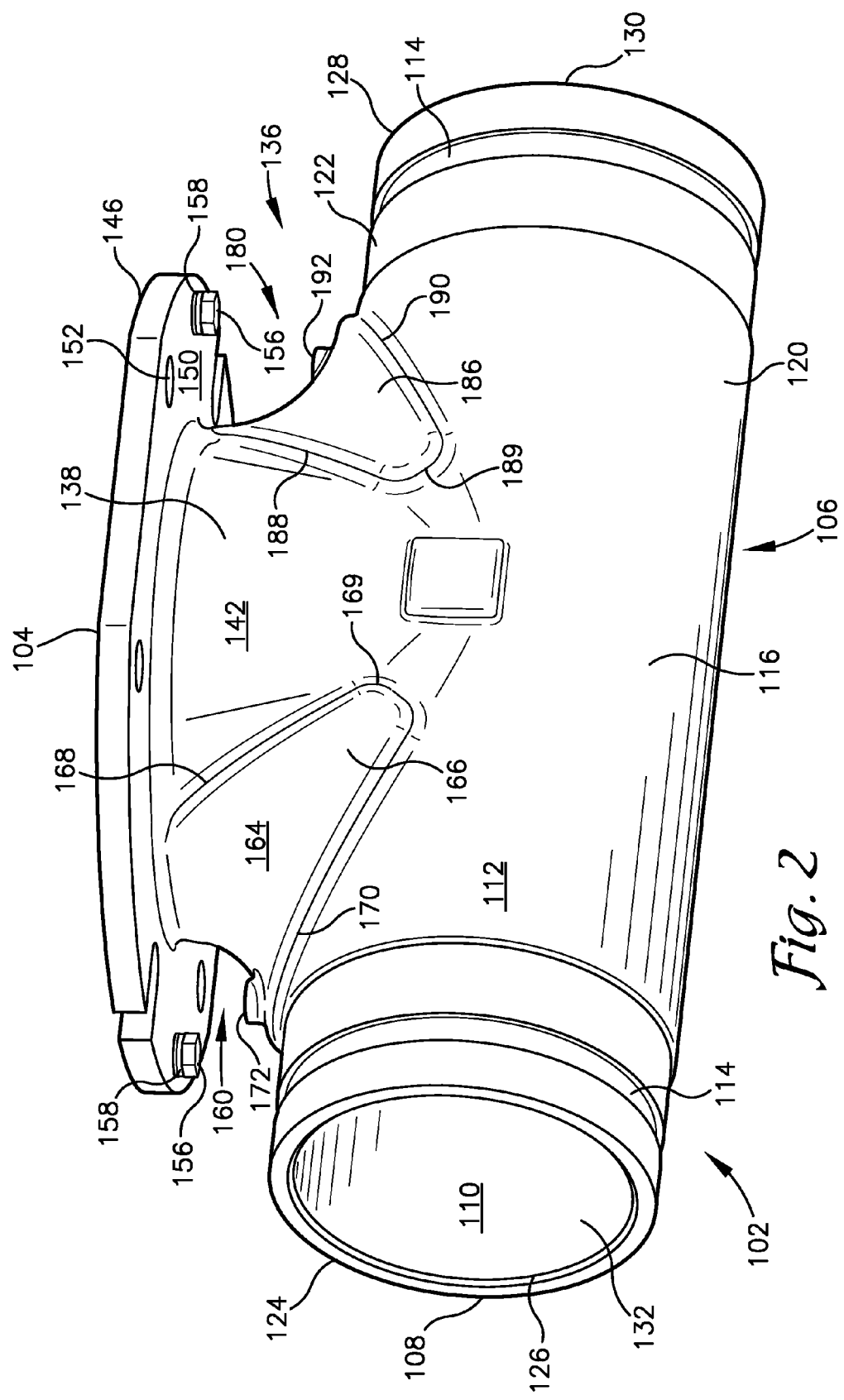
FIG. 2 is another perspective view of the conduit.
Figure 3:
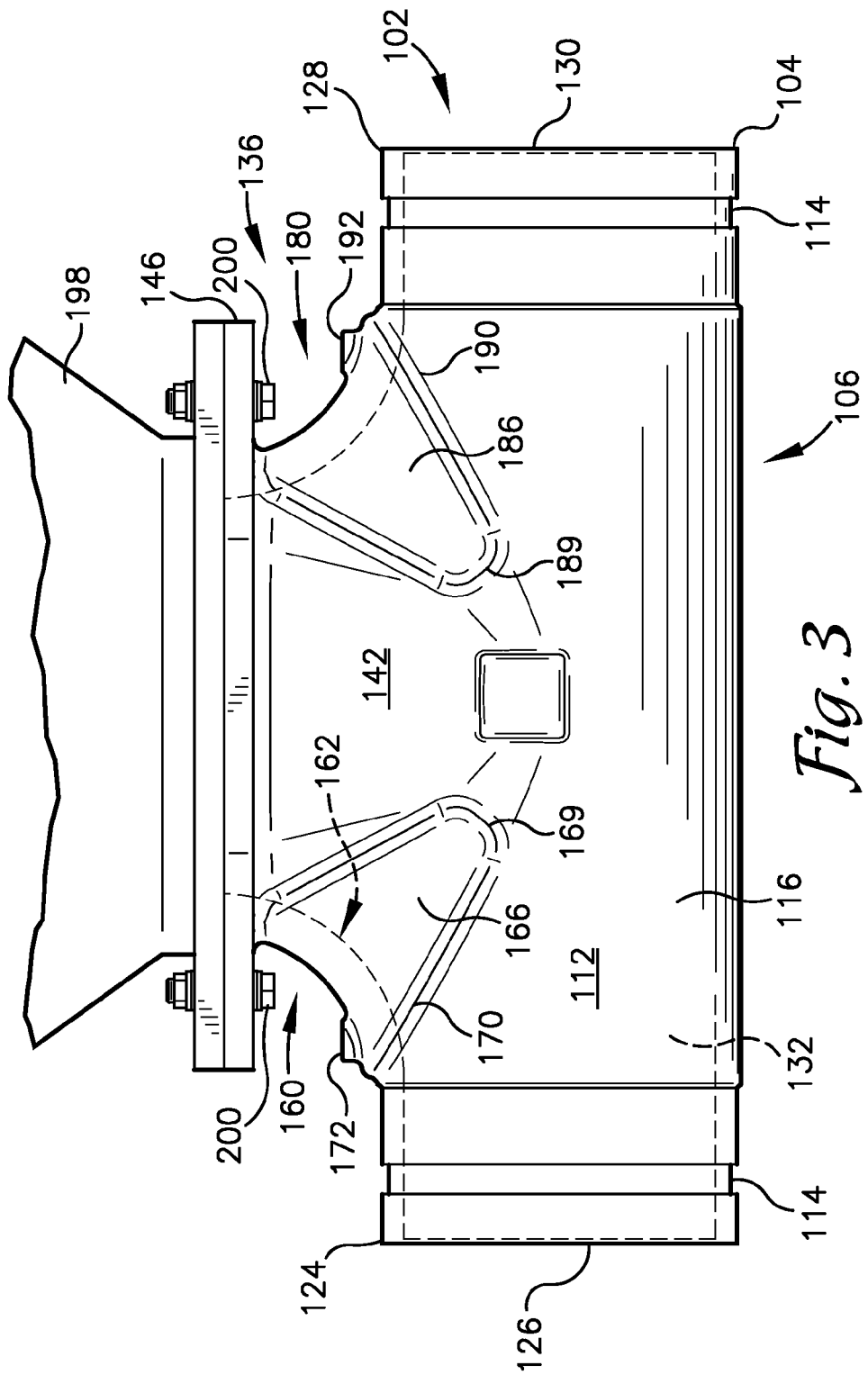
FIG. 3 is a side elevation view of the conduit connected to a container.
Figure 4:
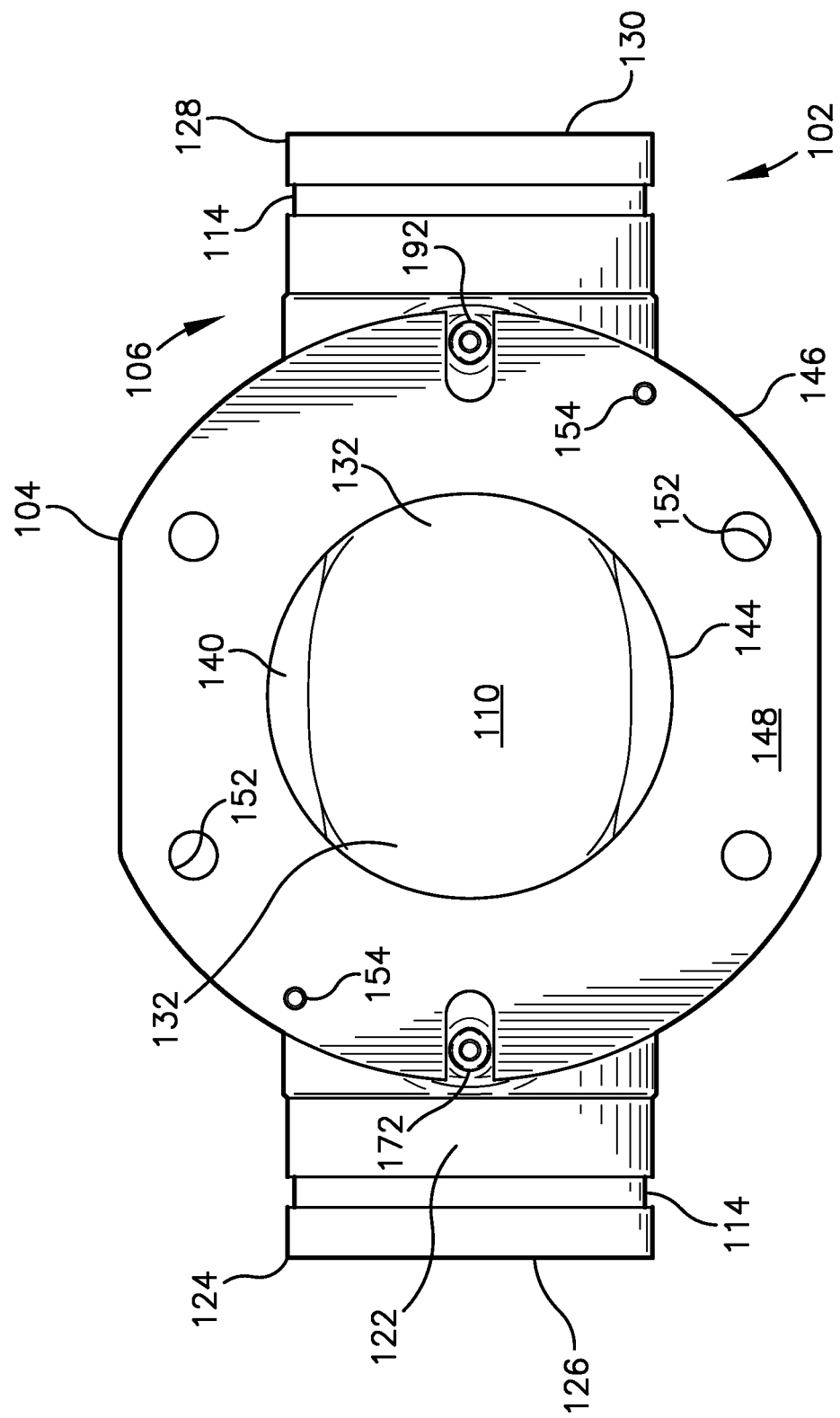
FIG. 4 is a plan view of the conduit.
Figure 5:
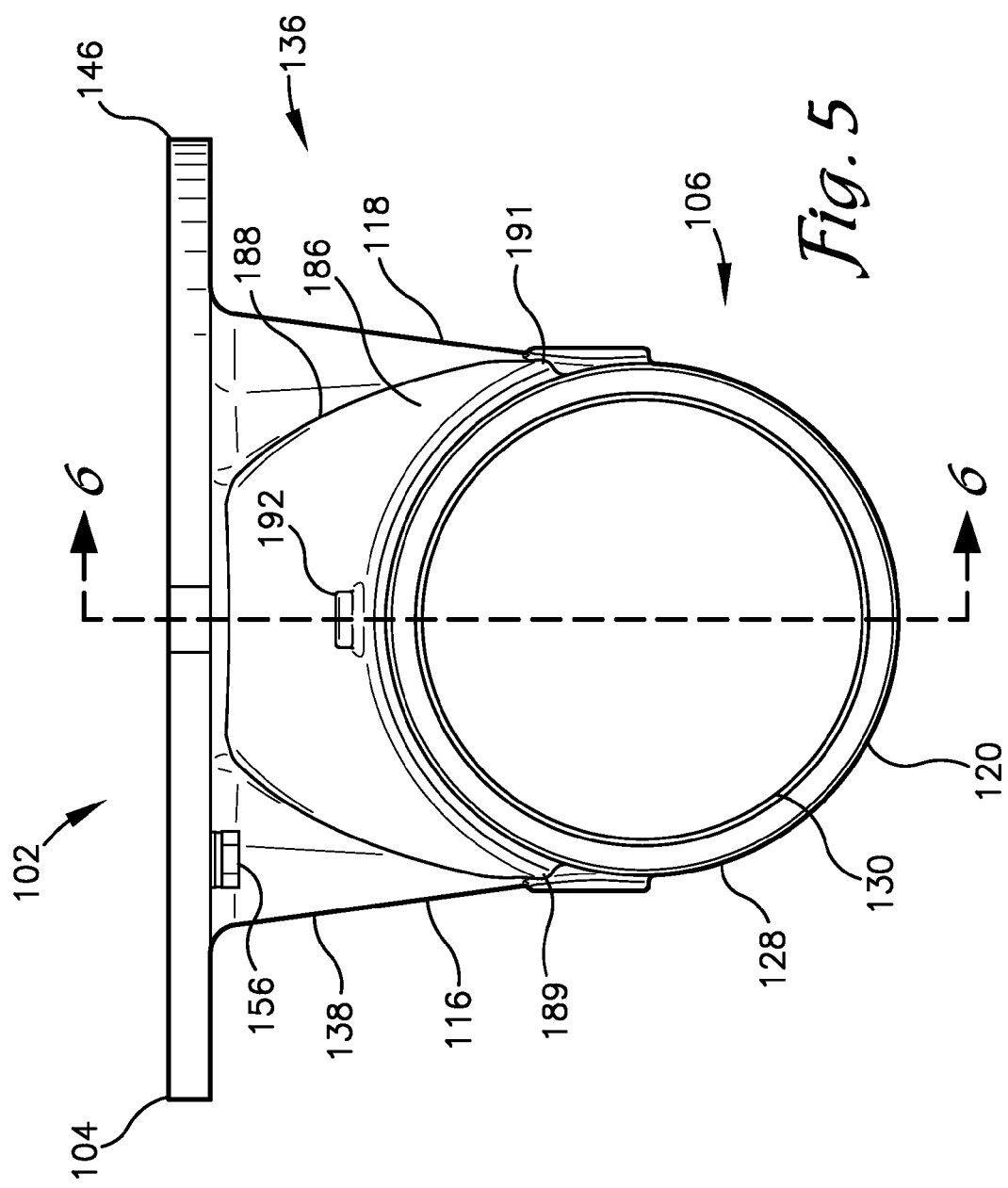
FIG. 5 is an end elevation view of the conduit.

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Referring to the drawings, a conduit 102 with a first wear port 172 and a second wear port 192 embodying principles of the disclosed subject matter is shown and described. In an embodiment, the conduit 102 includes a hopper tee 104 for the bulk transfer of material from a container 198 to another container or conduit. Often the material passing through the hopper tee 104 is abrasive, and over time, the material can wear away the walls of the hopper tee 104 causing failure of the hopper tee 104 and necessitating its repair or replacement. Wear is particularly prominent at locations where the material changes direction such as when a conduit redirects the flow of material moving in one direction to material moving in another direction, or when material is moving through a conduit and it encounters an intersection of conduits. The conduit 102 is manufactured from metal including steel, aluminum, and alloys thereof. The material passing through the conduit 102 includes solids, liquids, and gasses.

In an embodiment, the tee 104 includes a first tubular member and a second tubular member that intersect each other at an angle forming a radius. In an embodiment, the tee 104 includes a horizontal portion 106 that intersects a vertical portion 136, generally having an inverted T-shape. The horizontal portion 106 is an elongated tubular member extending between a first end 124 and a second end 128, with a top side 122 and a bottom side 120, and having a wall 108 extending between an inner surface 110 and an outer surface 112, defining a horizontal passage 132. Each of the first end 124 and second end 128 include an opening 126 and 130 adapted for connecting the hopper tee 104 to another conduit, including an elongated tubular conduit, or a container. Slots 114 permit attachment of a clamp or coupler for connecting the hopper tee 104 to another conduit. In an embodiment, the horizontal portion 106 and vertical portion 136 have a closed curve cross section.

The vertical portion 136 is a tubular member extending between the horizontal portion 106 and an inlet 144, having a wall 138 extending between an inner surface 140 and an outer surface 142, defining a vertical passage 145. The inlet 144 includes a flange 146 extending from the inlet 144 for mounting the hopper tee 104 below a container 198 including a bulk material tank trailer. The flange 146 has a top surface 148, and a bottom surface 150. Apertures 152 extending between the top surface 148 and bottom surface 150 allow the hopper tee 104 to be mounted to the container 198 with fasteners 200, including a nut and bolt combination. Threaded apertures 154 in the flange 146 receive a threaded plug 156 that optionally retain a seal 158. The plugs 156 are used to seal the ports 172 and 192, described in greater detail below. The transition between the vertical portion 136 and the horizontal portion 136, toward each of the first end 124 and second end 128, is by a first radius 160 and a second radius 180, respectively.

Figure 6:
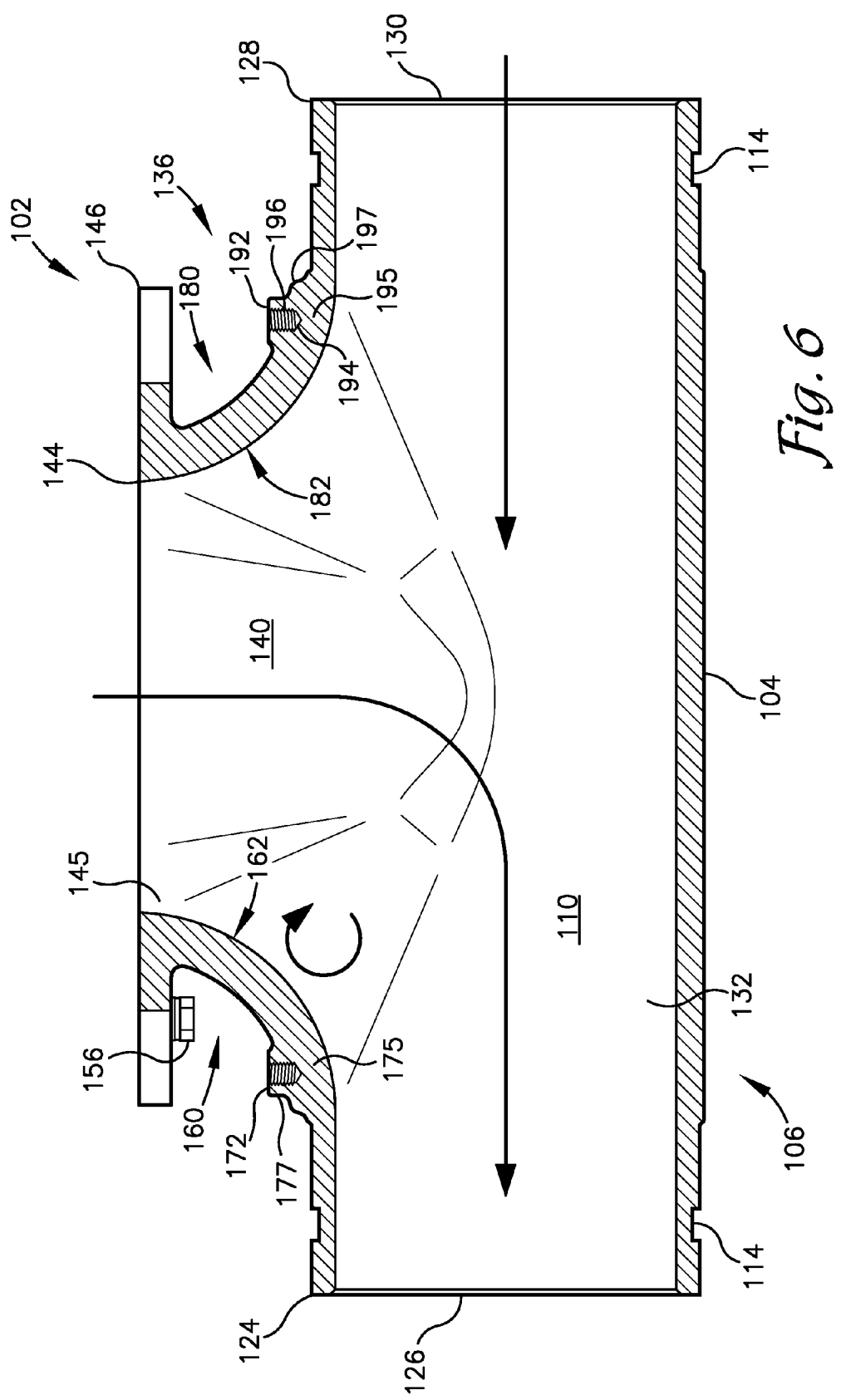
FIG. 6 is a cross-sectional view of the conduit taken along the line 6-6 in FIG. 5.

During use, material enters the inlet 144 by the force of gravity, the application of a vacuum, or pneumatics, and exits the hopper tee 104 through one of the ends in the horizontal portion 106, with the exit end functioning as an outlet. Additional material may enter the horizontal portion 106 through the opposite end, which thereby also functions as an inlet. Therefore, the hopper tee 104 can be used to transfer material in one of two directions. By way of example, the flow of material through the hopper tee is shown in FIG. 6 by arrows with material entering the inlet 144 and the second end 128, and exiting the first end 124. The flow of material also generates an eddy, shown by the circular arrow, that affects the abrasion of the material upon the wall of the hopper tee 104. Material may also transfer from the horizontal portion 106 into the vertical portion 136 depending upon the particular application in which the hopper tee 104 is being used. Because the material traveling through the hopper tee 104 abrades the walls of the hopper tee 104 the lifespan of the hopper tee 104 is dictated by the amount of abrasion and/or the thickness of the walls remaining after prolonged use. Therefore, if the hopper tee 104 is used to transfer material in primarily one of two directions from the inlet 144 the downstream radius will develop wear after prolonged use, and the hopper tee 104 can be rotated so that the opposite end is used as an outlet in order to maximize the lifespan of the hopper tee 104.

The radiuses adjacent the outlet end encounters wear during use due to the material properties and/or the flow of the material therethrough. The first radius 160 forms a generally curved transition between the vertical portion 136 and the first end 124 of the horizontal portion 106, and includes a thickened wall portion 166 extending between the inner surface 162 and outer surface 164. The thickened wall portion 166 is generally crescent-shaped and has an upper edge 168 adjacent the flange 146, a lower edge 170 adjacent a top side 122 of the horizontal portion 106, a first end 169 adjacent the first side (not shown), and a second end 171 adjacent the second side 118.

The first wear port 172, in the form of an upwardly-open cavity, is located on or adjacent the first radius 160. In an embodiment, the first wear port 172 is a cylinder, and includes a threaded side wall 176, and a bottom wall 174 disposed at a depth between the inner surface 162 and the outer surface 164 forming a sacrificial wall 175 extending between the exterior surface of the bottom wall 174 and the inner surface 162 of the first radius 160. In an embodiment, the first wear port 172 extends upward above the outer surface 164 and includes a boss 177.

The second radius 180 forms a generally curved transition between the vertical portion 136 and the second end 128 of the horizontal portion 106, and includes a thickened wall portion 186 extending between the inner surface 182 and outer surface 184. The thickened wall portion 186 is generally crescent-shaped and has an upper edge 188 adjacent the flange 146, a lower edge 190 adjacent the top side 122 of the horizontal portion 106, a first end 189 adjacent the first side 116, and a second end 191 adjacent the second side 118.

The second wear port 192, in the form of an upwardly-open cavity, is located on or adjacent the second radius 180. In an embodiment, the second wear port 192 is a cylinder and includes a threaded side wall 196, and a bottom wall 194 disposed at a depth between the inner surface 182 and the outer surface 184 forming a sacrificial wall 195 extending between the exterior surface of the bottom wall 194 and the inner surface 182 of the second radius 180. In an embodiment, the second wear port 192 extends upward above the outer surface 184 and includes a boss 197.

In an embodiment, the ports 172, 192 are located along the midline of the hopper tee 104. The ports 172, 192 provide an indication of the wear occurring at the interior surface of the hopper tee 104 prior to the hopper tee 104 suffering a catastrophic failure, thereby allowing a user to rotate the hopper tee 104 into a position where the unworn radius encounters wear until the associated port indicates sufficient wear upon the wall.

Figure 7:
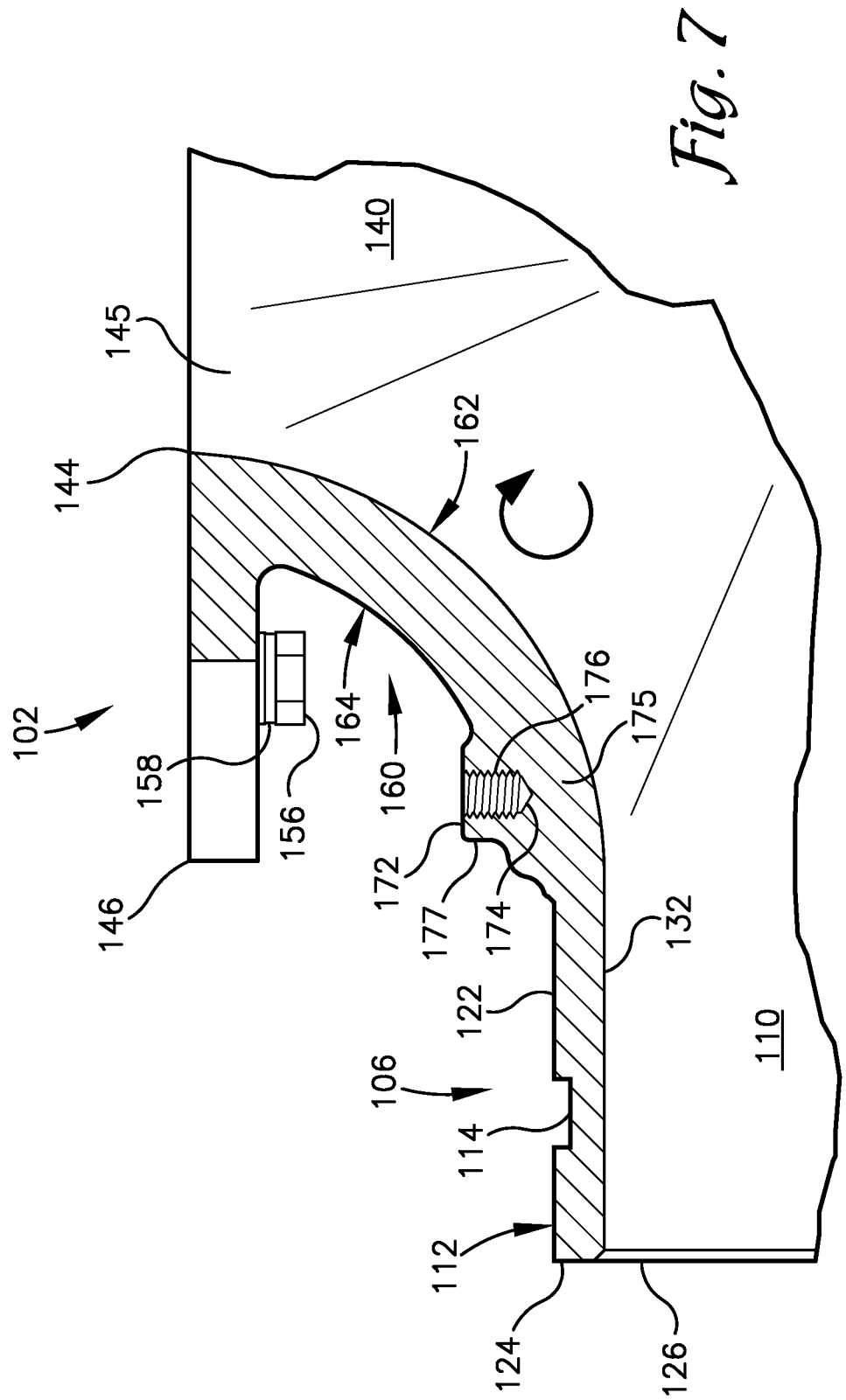
FIG. 7 is an enlarged cross-sectional view of the first radius taken generally within circle 7 in FIG. 6.
Figure 8:
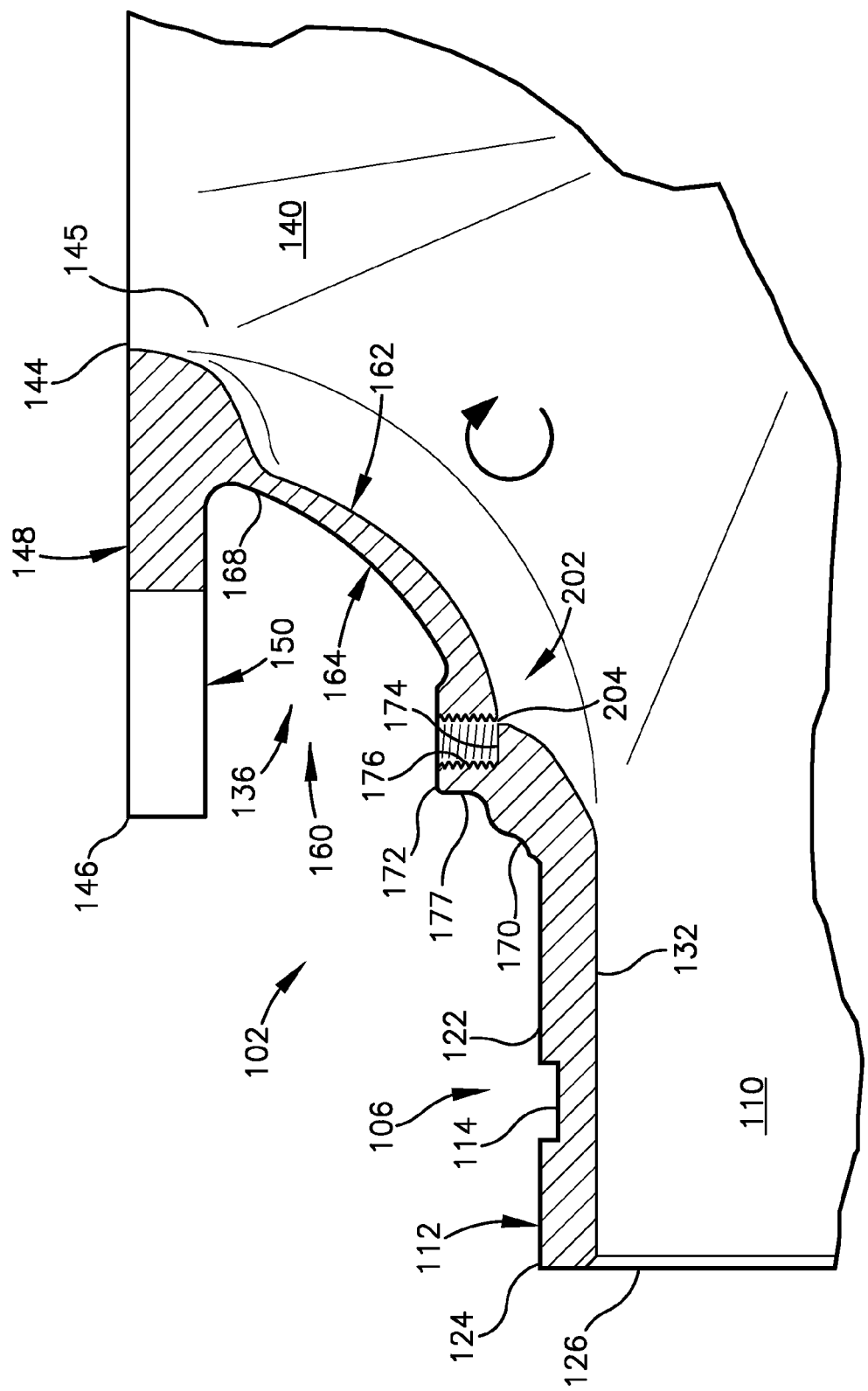
FIG. 8 is a cross-sectional view of the conduit showing wear of the body wall.
Figure 9:
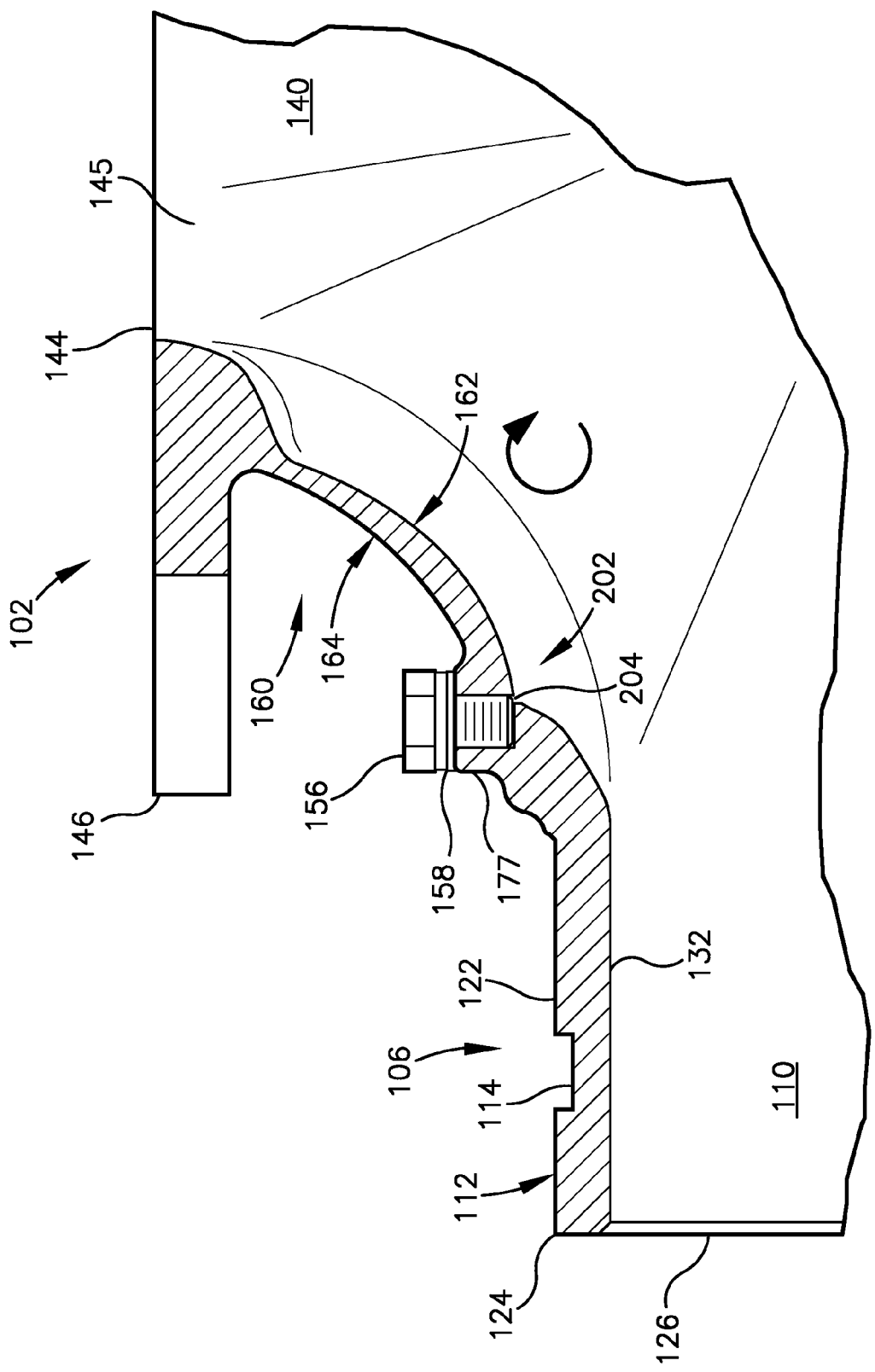
FIG. 9 is a cross-sectional view of the conduit showing the wear indicator filled by the plug.

Referring to FIG. 7, the first radius 160 of the hopper tee 104 is shown without the interior surface 162 worn away. Referring to FIGS. 8-9, the hopper tee 104 is shown with the interior surface 162 worn away by material flowing into the hopper tee 104 from the inlet 144 and exiting through the opening 126 at the first end 124. The first radius 160 is shown with a wear region 202 at the inner surface 162 that is worn to a depth whereby a passage 204 is formed between the port 172 and the interior of the hopper tee 104. The passage 204 allows some of the material passing through the interior of the hopper tee 104 to escape to the exterior of the tee 104 thereby providing a user with a visual indication that inner surface 162 of the first radius 160 is worn. The bottom wall 174 is disposed at a depth between the inner surface 162 and the outer surface 164 so that when the inner surface 162 is worn through, the hopper tee 104 retains sufficient structural support so that a user can continue to use the hopper tee 104 in its current orientation for a short period of time before rotating the hopper tee 104. A user seals the port 172 by removing a plug 156 from the flange 146 and securing the plug 146 in the port 172. Optional use of a seal 158 provides additional sealing results. The plugs 156 allow a user to close the passage 204 between the port 172 and the interior of the hopper tee 104 until the hopper tee 104 can be rotated.

By way of example, only wear upon the first radius 160 is shown. However, after use of the hopper tee 104 in an orientation whereby material flows into the hopper tee 104 from the inlet 144 and exits through the opening 130 at the second end 128, the inner surface 182 of the second radius 180 can become worn to a depth whereby a passage is formed between the port 192 and the interior of the hopper tee 104. The additional plug 156 is used to seal the port 192 allowing the user to continue to use the hopper tee 104 for a short period of time after both ports 172 192 are sealed. Once a user has worn both radiuses 160 and 180, the user removes the hopper tee 104 from the container 198 and replaces it with an unworn hopper tee 104 before the worn tee suffers a catastrophic failure.

It will be appreciated that the wear ports 172 and 192, and plugs 156 may be used at other locations on the hopper tee 104, and may be used with various types of conduits. Moreover, the hopper tee 104 can be fabricated in various sizes and from a wide range of suitable materials, using various manufacturing and fabrication techniques.

Although the subject matter has been disclosed with reference to various particular embodiments, it is understood that equivalents may be employed and substitutions made herein without departing from the scope of the invention as recited in the claims.

Having thus described the disclosed subject matter, what is claimed is:

1. A conduit for the movement of material, comprising:
   a horizontal portion, comprising:
      (a) a tubular member extending between a first end and a second end;
      (b) a wall extending between an inner surface and an outer surface, the wall defining a horizontal passage;
   a vertical portion, comprising:
      (a) a tubular member extending between an inlet and the horizontal portion;
      (b) a wall extending between an inner surface and an outer surface, the wall defining a vertical passage communicating with the horizontal passage;
   a first radius forming a generally curved transition between the inlet and the horizontal portion first end, the first radius forming:
      a crescent-shaped wall extending between an inner surface at the interior of the conduit, and an outer surface extending from the outer surface of the horizontal portion and the vertical portion providing structural support and sacrificial material to the conduit, the crescent-shaped wall outer surface comprising:
      (a) an upper edge adjacent the vertical portion;
      (b) a lower edge extending from the horizontal portion;
      (c) a first end extending from a first side of the conduit;
      (d) a second end extending from a second side of the conduit; and
   a first re-sealable port formed by the radius adjacent the first radius wall outer surface lower edge, the first port including an upwardly-open cavity having a bottom wall disposed within the first radius sealing the port, the bottom wall forming a sacrificial wall extending between the bottom wall and the inner surface of the first radius.

2. The conduit of claim 1, wherein the cavity is a threaded cylinder.

3. The conduit of claim 2, further comprising a first plug threadably received within the first port for sealing the port.

4. The conduit of claim 1, wherein the thickness of the first radius wall is greater than the thickness of the wall of the horizontal portion.

5. The conduit of claim 1, further comprising:
   a flange extending outward from the inlet; and
   an aperture within the flange.

6. The conduit of claim 5, wherein the aperture is threaded.

7. The conduit of claim 1, wherein the first port is disposed along a midline of the conduit.

8. The conduit of claim 1, further comprising:
   a second radius forming a generally curved transition between the inlet and the horizontal portion second end, the second radius forming a crescent-shaped wall extending between an inner surface and an outer surface providing structural support and sacrificial material to the conduit; and
   a second port formed by the second radius, the second port including an upwardly-open cavity having a bottom wall within the second radius sealing the port, the bottom wall forming a sacrificial wall extending between the bottom wall and the inner surface.

9. The conduit of claim 8, wherein the cavity is a threaded cylinder.

10. The conduit of claim 9, further comprising a second plug threadably received within the second port for sealing the port.

11. The conduit of claim 8, wherein the thickness of the second radius wall is greater than the thickness of the wall of the horizontal portion.

12. The conduit of claim 8, wherein:
   the second radius wall outer surface further comprises:
      an upper edge adjacent the vertical portion;
      a lower edge adjacent the horizontal portion;
      a first end adjacent a first side of the conduit;
      a second end adjacent a second side of the conduit; and
   the second port is adjacent the radius wall outer surface lower edge.

13. The conduit of claim 8, wherein the second port is disposed along a midline of the conduit.

14. A conduit for the movement of material, comprising:
   a horizontal portion, comprising:
      (a) a tubular member extending between a first end and a second end; and
      (b) a wall extending between an inner surface and an outer surface, the wall including a thickness and defining a horizontal passage;
   a vertical portion, comprising:
      (a) tubular member extending between an inlet and the horizontal portion;
      (b) a wall extending between an inner surface, defining a vertical passage communicating with the horizontal passage, and an outer surface; and
      (c) a flange at the inlet;
   a radius forming a generally curved transition between the inlet and the horizontal portion first end, the radius forming:
      a crescent-shaped wall extending between an inner surface at the interior of the conduit, and an outer surface extending from the outer surface of the horizontal portion and the vertical portion, the wall including a thickness greater than the thickness of the wall of the horizontal portion, the outer surface of the crescent-shaped wall comprising:
      (a) an upper edge adjacent the flange;
      (b) a lower edge extending from the horizontal portion;
      (c) a first end extending from a first side of the conduit; and
      (d) a second end extending from a second side of the conduit;
   a re-sealable port formed by the radius, the port including an upwardly-open threaded cylinder having a bottom wall disposed within the radius sealing the port, the bottom wall forming a sacrificial wall extending between the bottom wall and the inner surface of the radius; and
   wherein the radius provides structural support and sacrificial material to the conduit.

15. The conduit of claim 14, further comprising:
   a flange extending outward from the inlet;
   a threaded aperture within the flange;
   a plug threadably received within the threaded cylinder for sealing the port.

16. The conduit of claim 14, wherein:
   the port extends upward from the outer surface of the radius; and
   a boss is disposed on the port.

17. A conduit for the movement of material, comprising:
a horizontal portion, comprising:
- (a) a tubular member extending between a first end and a second end; and
- (b) a wall extending between an inner surface and an outer surface, the wall including a thickness and defining a horizontal passage;

a vertical portion, comprising:
- (a) a tubular member extending between an inlet and the horizontal portion; and
- (b) a wall extending between an inner surface, defining a vertical passage communicating with the horizontal passage, and an outer surface;

a first radius forming a generally curved transition between the inlet and the horizontal portion first end, the first radius forming:
a crescent-shaped wall extending between an inner surface at the interior of the conduit and an outer surface, the wall outer surface extending from the outer surface of the horizontal portion and the vertical portion, the wall including a thickness greater than the thickness of the wall of the horizontal portion comprising:
- (a) an upper edge adjacent the vertical portion;
- (b) a lower edge extending from the horizontal portion;
- (c) a first end extending from a first side of the conduit; and
- (d) a second end extending from a second side of the conduit;

a first port formed by the first radius adjacent the first radius lower edge, the first port including an upwardly-open threaded cylinder having a bottom wall disposed within the first radius sealing the first port, the bottom wall forming a sacrificial wall extending between the bottom wall and the inner surface of the first radius;

a second radius forming a generally curved transition between the inlet and the horizontal portion second end, the second radius forming:
a crescent-shaped wall extending between an inner surface and an outer surface, the wall outer surface extending from the outer surface of the horizontal portion and the vertical portion, the wall including a thickness greater than the thickness of the wall of the horizontal portion comprising:
- (a) an upper edge adjacent the vertical portion;
- (b) a lower edge extending from the horizontal portion;
- (c) a first end extending from a first side of the conduit; and
- (d) a second end extending from a second side of the conduit;

a second port formed by the second radius adjacent the second radius lower edge, the second port including an upwardly-open threaded cylinder having a bottom wall disposed within the first radius sealing the second port, the bottom wall forming a sacrificial wall extending between the bottom wall and the inner surface of the second radius; and wherein the first radius and the second radius provide structural support and sacrificial material to the conduit.

18. The conduit of claim 17, further comprising:
a first plug threadably received within the first port; and
a second plug threadably received within the second port.

19. A method of manufacturing a hopper tee, comprising:
forming a horizontal portion, comprising:
- (a) a tubular member extending between a first end and a second end; and
- (b) a wall extending between an inner surface and an outer surface, the wall defining a horizontal passage;

forming a vertical portion, comprising:
- (a) a tubular member extending between an inlet and the horizontal portion; and
- (b) a wall extending between an inner surface and an outer surface, the wall defining a vertical passage communicating with the horizontal passage;

forming a first radius comprising a generally curved transition between the inlet and the horizontal portion first end, the first radius forming:
a crescent-shaped wall extending between an inner surface at the interior of the conduit, and an outer surface extending from the outer surface of the horizontal portion and the vertical portion providing structural support and sacrificial material to the conduit, the crescent-shaped wall outer surface comprising:
- (a) an upper edge adjacent the vertical portion;
- (b) a lower edge extending from the horizontal portion;
- (c) a first end extending from a first side of the conduit; and
- (d) a second end extending from a second side of the conduit; and forming a first re-sealable port disposed within the radius adjacent the first radius wall outer surface lower edge, the first port including an upwardly-open cavity having a bottom wall disposed within the first radius sealing the port, the bottom wall forming a sacrificial wall extending between the bottom wall and the inner surface of the first radius.

20. The method of claim 19, wherein the cavity is a threaded cylinder.

21. The method of claim 19, further comprising providing a first threaded plug for sealing the port.

22. The method of claim 19, wherein the thickness of the first radius wall is greater than the thickness of the wall of the horizontal portion.

* * * * *